Nov. 30, 1965 K. BECKER 3,220,488
ROTARY TILLAGE TOOL, ESPECIALLY FOR USE
BETWEEN PLANT OR SEED ROWS
Filed July 16, 1962 6 Sheets-Sheet 1
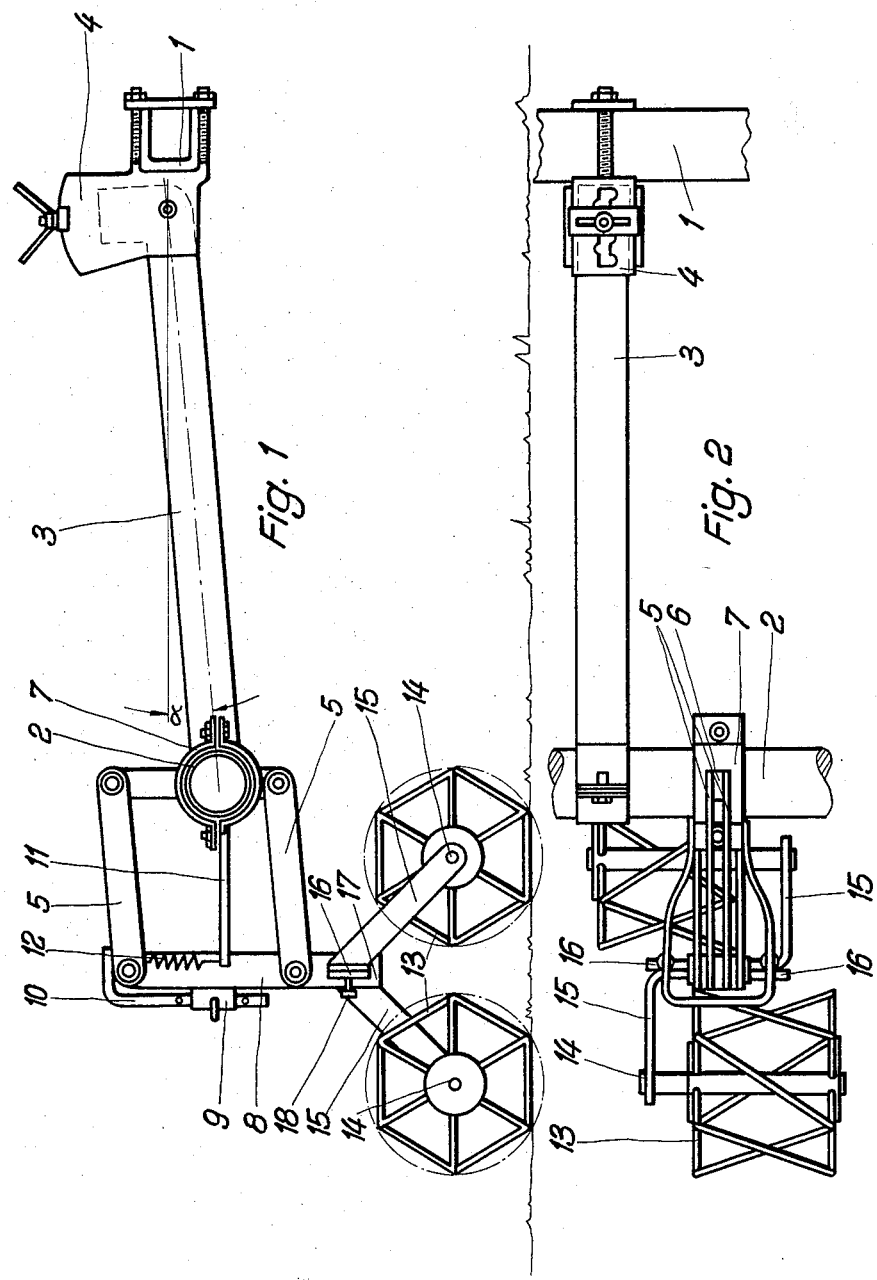
Inventor:
Karl Becker
By Ernest J. Montague
Attorney Inventor:
Karl Becker Inventor:
Karl Becker
By Ernest G. Montagu
Attorney Nov. 30, 1965          K. BECKER              3,220,488
           ROTARY TILLAGE TOOL, ESPECIALLY FOR USE
              BETWEEN PLANT OR SEED ROWS
Filed July 16, 1962                      6 Sheets-Sheet 4

Inventor:
Karl Becker
By Ernest F. Montague
   Attorney

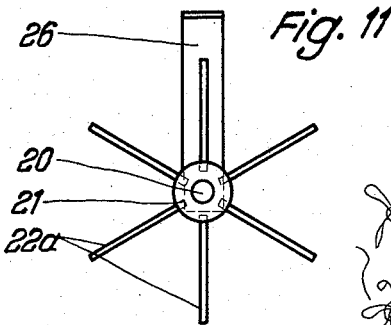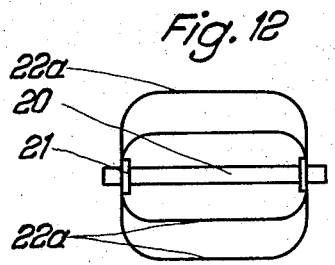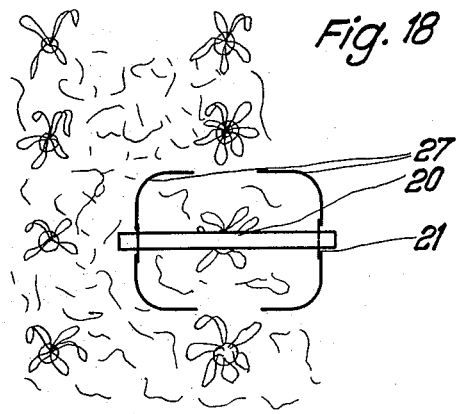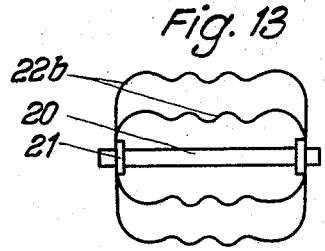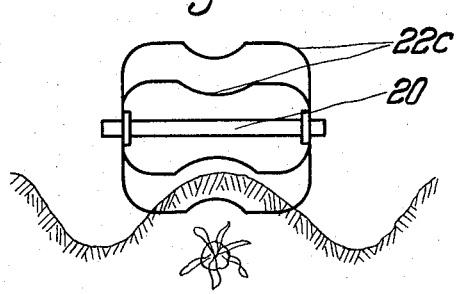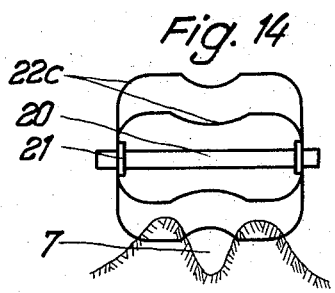

Inventor:
Karl Becker
By Ernest F. Montague
Attorney

United States Patent Office 3,220,488
Patented Nov. 30, 1965

3,220,488
ROTARY TILLAGE TOOL, ESPECIALLY FOR USE
BETWEEN PLANT OR SEED ROWS
Karl Becker, Gieselwerder (Weser), Germany
Filed July 16, 1962, Ser. No. 209,901
Claims priority, application Germany, Aug. 1, 1961,
B 63,471
4 Claims. (Cl. 172—551)

The present invention relates to a tillage tool, especially for use between plant or seed rows.

It is known that the soil on which plants are grown has to be well worked over again, to loosen it and to destroy the weeds. It is difficult, however, to work the soil between the seed and plant rows, because the seeds and the plants are easily damaged and because the space between the rows becomes smaller with growing plants.

The tillage tools used so far are not very well suited for such work between the rows because of their overall dimension. On the other hand, rotary harrows are known which employ roller tillers rolling on the ground and consisting of star-shaped rollers, the points of which being connected wtih each other by means of wires, rods, or the like arranged parallel or inclined relative to the roller axis. These implements, however, are unsuitable for inter-row cultivation because of their working width.

It is one object of the present invention to provide an implement which comprises roller tillers to enable the soil between the rows to be worked.

It is another object of the present invention to provide a particularly suitable shape of the roller tillers which is of great advantage when employed in bigger implements which are used not only for inter-row cultivation.

It is yet another object of the present invention to provide at least two of such roller tillers rolling on the ground, which are of smaller width than the distance between the plant rows, and which are adjustably disposed in a common holder at right angles to the rows. This arrangement and the shape of the two roller tillers have the advantage that with the rollers adjusted to great working width, all of the soil between the plant rows can be worked, the working width being adjustable to the different row spacing which varies with the different crops. Upon starting the cultivation with the implement set to great working width, it is possible to reduce then the width as the growing crop may necessitate.

Preferably, one group of roller tillers is provided for each plant of seed row, and several groups are arranged in a common frame for simultaneous working of several rows.

It is still another object of the present invention to provide a tillage tool, which can be applied not only during inter-row cultivation, but also by employing two tillage implements one behind the other, so that the carrier of the roller tiller is arranged on the frame of an implement used for planting or cultivating, as for instance of a hoe, a ridger, a cultivator, a disc or vibrating harrow, or it is combined with such tools in a manner such that the roller tiller unit follows the first implement. It is of no importance, if only one roller tiller of great working width or several smaller ones are used in the unit. In this way, for instance, it is possible to hoe, harrow, ridge and cultivate in one single operation. Conveniently, the roller tiller unit is arranged pivotally or slideably in vertical direction on the implement preceding the roller tiller unit, and is connected to the implement by means of a spring in a manner such that it is pressed on or into the ground relative to the first implement.

It is yet another object of the present invention to provide a tillage tool, wherein as may be required by the soil surface or the cultivation necessity, the different roller tillers may be mounted in the carrier with their axes at an angle or parallel to the ground, or their axes may be inclined relative to the transverse axis of the implement. In any case, the position of the roller axis is adjustable relative to the horizontal line or to the vehicle transverse axis.

In case work has to be done on potato ridges or the like, two roller tillers are provided and arranged inclined relative to each other to correspond to the shape of the ridges. These two roller tillers may have associated with them one or more rollers to work on the ridge tops. They are removed again when the potato foliage comes out. It is of no importance if the rollers forming the implement have overlapping working surfaces and work between two adjacent rows or if they are adjusted so that they work on the right and left side of a row which is enclosed between them.

It is sitll another object of the present invention to provide a tillage tool, wherein the holder mounting the roller tillers pivots in vertical direction and may be carried by double arms forming a parallel linkage, with springs being provided, the tension of which being adjustable, to press the holder against the soil. When using roller tillers having wires, rods, or the like arranged helically or at an angle relative to the roller axis, two rollers with opposed pitch may cooperate.

It is also another object of the present invention to provide a tillage tool, wherein a particularly suitable shape of the roller tillers which may be generally used, i.e. also in implements having a working width greater than the distance between two rows.

It is yet another object of the present invention, to provide a tillage tool, wherein the points of the star-shaped rollerss, which form the implement are interconnected by means of wires, rods, or the like which are formed of a common, substantially U-shaped metal frame, the ends of which are mounted to hubs arranged on a shaft or on the shaft itself. The U-shaped metal frame may be made of a single profiled wire, round wire, or the like or it may be punched of sheet metal. Each frame may be plane or bent and fastened such that their arms are at different levels and the cross member is arranged helically or at an angle relative to the roller axis. In the cross member, bendings may be provided arranged radially radially relative to the axis, or in circumferential direction. It is also possible to fasten the frames with their arms on the roller shaft, so that they lead or lag relative to the circumference, or each frame may consist of two parts so that the frames have an opening in the cross member, the parts being mounted on the hub with their ends facing each other or facing to opposite directions.

It is still a further object of the present invention to provide a tillage tool, wherein the roller tiller, together with their frames, forms during the rotation a rotary body in the form of a cylinder, of a cone or truncated cone, of a paraboloid, a sphere, or the like. The metal frames may also form a T. Together with the other elements, the vertical part is connected to the hub approximately in the middle of the roller tiller to form a star-shaped roller, and the rods, wires, or the like which penetrate into the ground project towards the outside. The T-pieces, arranged parallel or at an angle relative to the roller axis, may be fixed to only one hub.

With these and other objects in view, which will become apparent in the following detailed description, the present invention will be clearly understood in connection with the accompanying drawings, in which:

FIGURES 1 and 2 are a side elevation and a top plan view, respectively, of an implement provided with roller tillers in accordance with the present invention;

FIGS. 11 to 24 are diagrammatic views of different embodiments of roller tillers.

Figure 3:
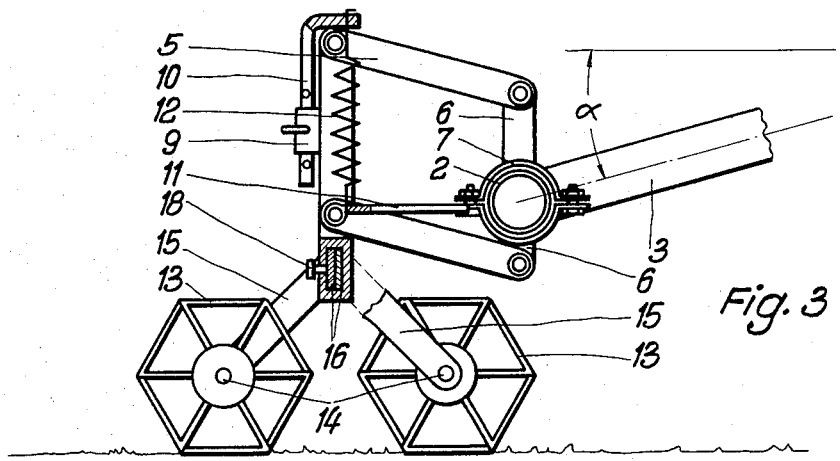
FIG. 3 is a side elevation partly in section on an enlarged scale, of the same implement shown in FIG. 1, in operating position.

Referring now to the drawings, and in particular to FIGS. 1 to 3, according to operating requirements, the implement is attached to a draw-bar 1 of a tractor (not shown), to a cross member of a hoe or ridger or to any other tool to be combined with the roller tiller. It comprises a pipe-shaped cross member 2 carried by lateral arm 3, which in turn are secured to the draw bar 1 or to a brace of the preceding implement by means of an adjusting device 4. The angle α can be adjusted relative to the ground by means of the adjusting device 4. According to the number of rows to be worked, the cross member 2 is provided with several tiller units as shown in FIGS. 1 and 2. Each unit depends from a bracket 8 which through means of parallel links 5 is attached to a holder 6 to enable a vertical up-and-down movement. The holder 6 is adjustably mounted on the cross member 2 by means of clamps 7. An angular member 10 is guided for vertical adjustment in a vertical guide 9 which is secured to the bracket 8 and an arm 11 is secured to the clamps 7. A tension spring 12 is disposed between the angular member 10 and the arm 11 to urge the bracket 8 carrying roller tillers 13 towards the ground depending upon the adjusted position of the member 10. Generally, the same arrangement of parallel links 5 and springs 8 may be used when a single roller tiller is attached to another implement working in front of the tiller.

Each roller tiller 13, which will be described later, is rotatably journalled on a shaft 14 which in turn is arranged on a holder 15. Each holder 15 ends in a cross member 16 which together with the cross member 16 of a second roller tiller 13 is held in the guide 17 provided on the bracket 8, by means of the set screw 18.

FIGS. 4 to 10 show different arrangements of the roller tillers 13 for use between seed rows S or plant rows KP or GP or potato ridges KD. When the distance between the rows equals A, the roller tillers 13 having a width equal to C, may be set in their common bracket 8, 17 to a working width B, B', or B'' as may be required by the size of the growing plants. When several roller tillers 13 are provided on a common cross member 2, this can be done for each row. It is also possible to arrange the roller tillers 13 such that they enclose a plant row KD or a potato ridge between them, as shown in FIGS. 7 to 10. When the bracket 8 or holder 15 is designed accordingly, the roller tillers 13 may also be adjusted at an angle relative to the transverse axis (FIG. 8), or to the horizontal line (FIG. 10) so that, for instance, in the latter case both sides of a potato ridge KD are worked at the same time. Before planting the potatoes and as long as the plants have not grown up, the top of the ridge may be worked by a third roller tiller 13' which may be fitted optionally.

The design of the roller tiller itself is of great importance and constitutes a particular object of the present invention. It is known that during the rolling movement on the ground, the wires or rods of the roller tiller 13 must penetrate the ground surface somewhat, so that the clods which remain from previous ploughing or hoeing are broken and crumbled up to obtain a very loose tilth and good aeration of the soil, and to remove and destroy weeds at the same time.

Several particularly suitable embodiments of such roller tillers 13 are illustrated in FIGS. 11 to 24, which can be used not only between seed or plant rows as shown in FIGS. 1 to 10, but also in bigger implements for working larger areas. Each roller tiller 13 is provided with a shaft 20 formed either of solid bar material with the ends arranged in suitable bearings, or of a hollow pipe pushed over an axle pin. According to the required width of the roller, hubs 21 are provided on the shaft 20 and mount, in a star-shaped arrangement, several (six, for instance) U-shaped members 22a to 22e (FIGS. 11 to 15 and 19 to 22). These members may be formed of wire or punched from sheet metal, and they may be of round, rectangular or triangular cross-section. When their section is of angular shape, they may be twisted, if desired.

Figure 19:
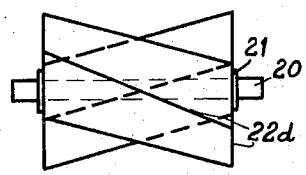
Figure 20:
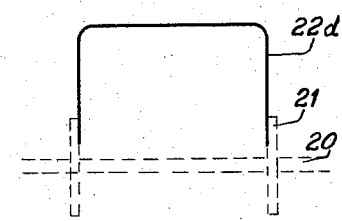
Figure 21:
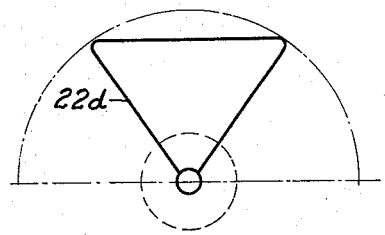
Figure 23:
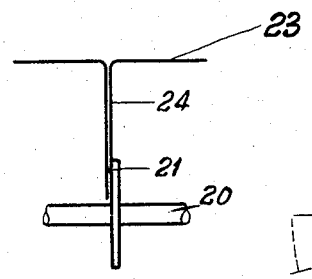
Figure 24:
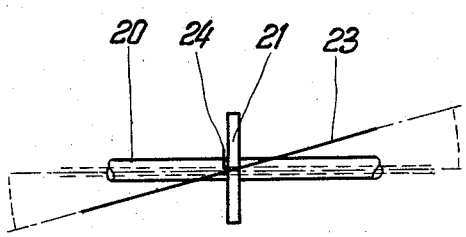

In the embodiment of the roller tiller according to FIGS. 11 to 15, the actual working part of these members is plane, i.e. the transverse part between the arms is coaxial, while in the embodiment, according to FIGS. 1 to 4 and FIGS. 19 to 22, the acting part of the members 22d is arranged at an angle relative to the shaft 20, which facilitates penetration into the soil. The members 22a (FIGS. 11 and 12) have a plane transverse part. The member 22b (FIG. 13) has a corrugated transverse part and the member 22c (FIGS. 14 and 15) has an inward bent portion. The member 22e (FIG. 22) has its transverse part shaped like an arrow in circumferential direction. The member may be of any desired form and is adapted to the operation requirements of the roller tiller, i.e. for covering seed rows (FIG. 14), working of potato ridges (FIG. 15), opening of furrows, forming of ridges, removal of weeds, etc. If roller tillers, as shown in FIGS. 19 to 21 are used in pairs, in an implement illustrated in FIGS. 1 to 3, they are preferably mounted so that their pitch is opposed.

The mounting of the members 22a to 22e to the hubs 21 is made such that the arms of the U-shaped members are arranged in radial direction or they lag somewhat behind in circumferential direction.

Figure 22:
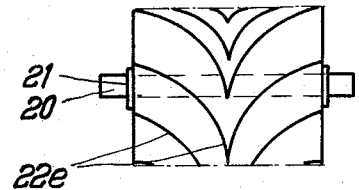

The same action may be obtained when T-shaped tools 23 and 24 (FIGS. 23 and 24) are provided instead of the members 22. In this case, a single hub 21 on the shaft 20 will suffice, the hub mounting the bent-wire or punched sheet metal tools in the form of a star, the transverse part 23 being arranged at an angle or parallel to the shaft. The transverse part may also be corrugated, bent, or buckled (FIGS. 13, 14 and 22).

Figure 16:
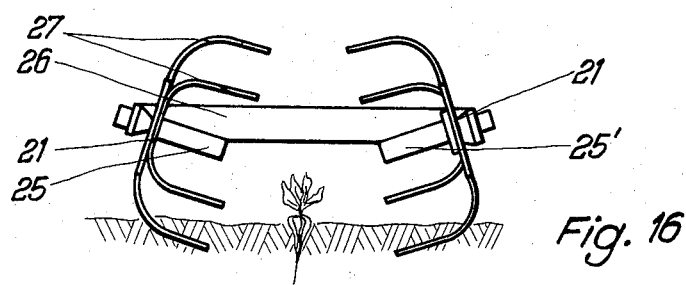
Figure 17:
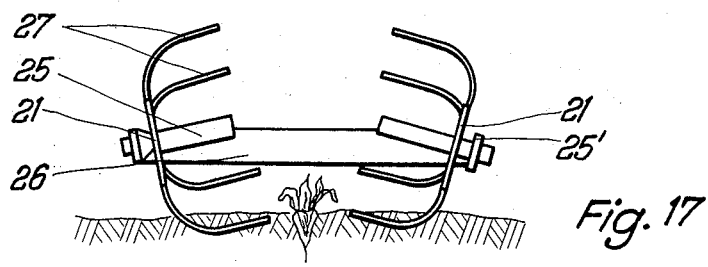
Figure 4:
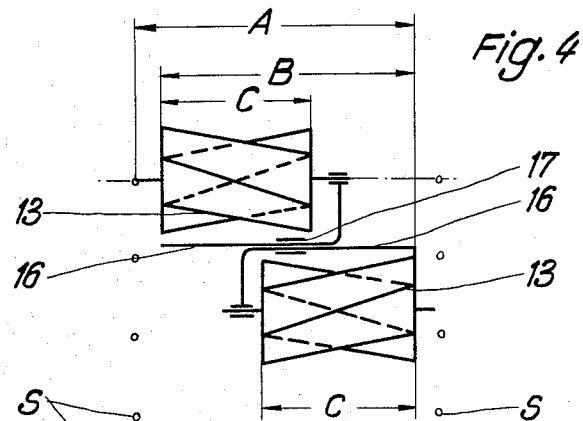
FIGS. 4 to 10 are diagrammatic views showing different operations of the implement.
Figure 5:
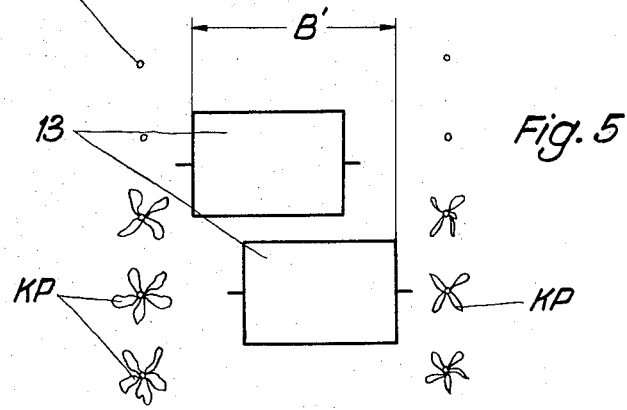
Figure 6:
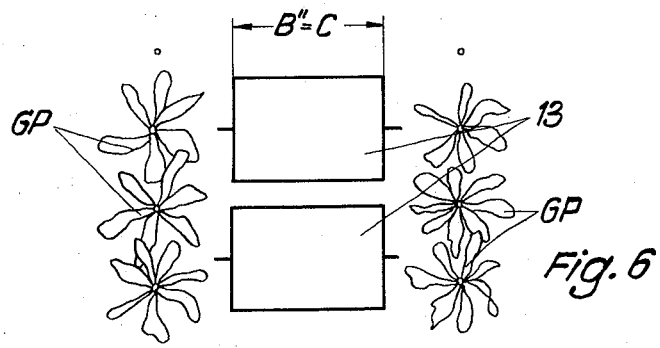
Figure 7:
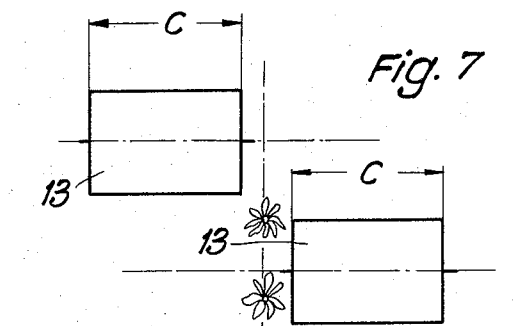
Figure 8:
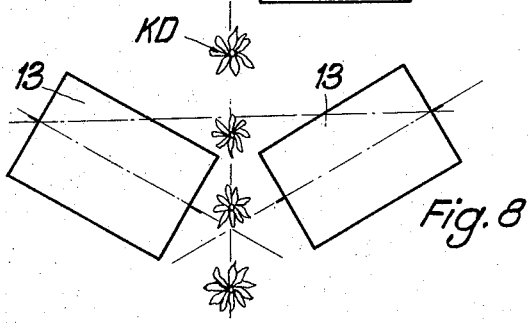
Figure 9:
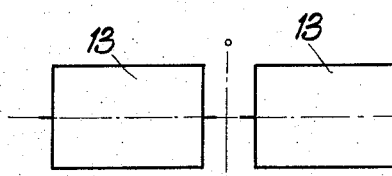
Figure 10:
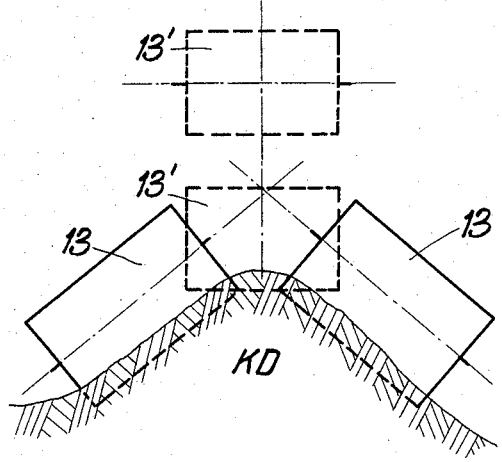

FIGS. 16 to 18 show another embodiment of a roller tiller. Here, either a shaft 20 with two hubs 21, as described before, or axle stubs 25, 25' with a hub 21 each are used, and are arranged in a holder 26. In similar manner, as described above, half rollers 27 are attached to the hubs so that in the middle of the roller tiller a strip of soil remains which is not worked, a plant row, for instance. In the arrangement, according to FIGS. 16 and 17, the half-rollers 27 may be adjusted so that their shafts are in any desired position relative to each other.

During their operation, all types of rollers form rotary bodies. Depending upon the shape of the tools, these rotary bodies may form a cylinder, a sphere, a cone or truncated cone, a paraboloid, or the like. When the rollers are arranged in pairs, they may be pushed together so that their circumferences penetrate each other when the members are of L- or T-shape and when they are mounted resiliently.

While I have disclosed several embodiments of the present invention, it is to be understood that these embodiments are given by example only and not in a limiting sense, the scope of the present invention being determined by the objects and the claims.

I claim:

1. A tillage tool particularly for use between plant or seed rows comprising a cross member adapted to be secured to a pulling vehicle, a holder secured to and adjustably mounted above and below said cross member by clamping means, a substantially vertically disposed bracket disposed spaced apart from said cross member, linkage means connecting said bracket with said holder for a vertical adjustment movement of said bracket, a vertical guide secured to said bracket, an angular member guided for vertical adjustment in said vertical guide, an arm secured to said clamping means and extending toward said bracket, spring means secured to said angular member and to said arm, respectively, tending to retain said bracket in its lowermost position, a plurality of roller tillers, means for turnably suspending said roller tillers from the lower portion of said bracket, said roller tillers being of a width smaller than the distance between a pair of adjacent plant rows, and said roller tillers being independently turnably suspended from said bracket, means for adjusting the relative distance between said roller tillers, a group of roller tillers comprising at least two tiller rollers is coordinated to each plant row, a draw bar, lateral arms connecting said draw bar with said cross member, said roller tillers having an axle disposed obliquely toward the surface of the ground, means for adjusting the angular position of said axle of said roller tillers, and each of said roller tillers having an axle, and said axles of successive roller tillers being spaced apart such that the peripheral circles of said roller tillers overlap each other.

2. The tillage tool, as set forth in claim 1, which includes two roller tillers having their axles inclined toward each other, and at least one third roller tiller being disposed centrally in front of said two roller tillers.

3. The tillage tool, as set forth in claim 1, which includes means for laterally adjustably mounting said roller tillers relative to each other.

4. The tillage tool, as set forth in claim 1, wherein said roller tillers comprise a plurality of helical wires arranged around the periphery of said roller tillers and at a predetermined pitch and in a predetermined direction, and two of said roller tillers having opposite pitch of said wires forming a pair of said roller tillers.

References Cited by the Examiner

UNITED STATES PATENTS

| 100,128 | 2/1870 | Dunn | 172—540 X |
| 114,127 | 4/1871 | Gatling | 172—540 |
| 845,902 | 3/1907 | Sharp | 172—582 |
| 1,210,185 | 12/1916 | McLeod | 172—552 |
| 1,244,982 | 10/1917 | Horst | 172—556 X |
| 1,639,307 | 8/1927 | Neu | 172—184 X |
| 1,699,151 | 1/1929 | Miller et al. | 172—540 |
| 2,089,451 | 8/1937 | Tolar | 172—552 |
| 2,747,488 | 5/1956 | Norton | 172—307 |
| 2,815,704 | 12/1957 | Bloom et al. | 172—307 X |
| 2,899,776 | 8/1959 | Arnold | 172—484 X |
| 2,907,394 | 10/1959 | Cook | 172—582 X |
| 2,975,844 | 3/1961 | Oehler et al. | 172—484 |
| 2,994,387 | 8/1961 | Lehman et al. | 172—600 X |
| 3,082,829 | 3/1963 | Buddingh et al. | 172—184 |

FOREIGN PATENTS 247,624 12/1947 Switzerland.

John Deere Operator's Manual No. OM–N8–755, pages 11, 12 and 34.

ABRAHAM G. STONE, *Primary Examiner.*

A. JOSEPH GOLDBERG, ANTONIO F. GUIDA, T. GRAHAM CRAVER, *Examiners.*